Sept. 10, 1929.  P. R. DRENNING  1,727,867
AUXILIARY SPRING MECHANISM FOR TRUCKS
Filed Nov. 12, 1927
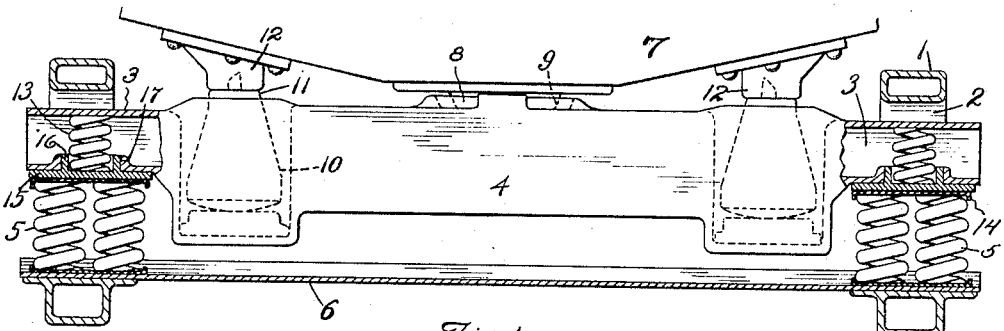
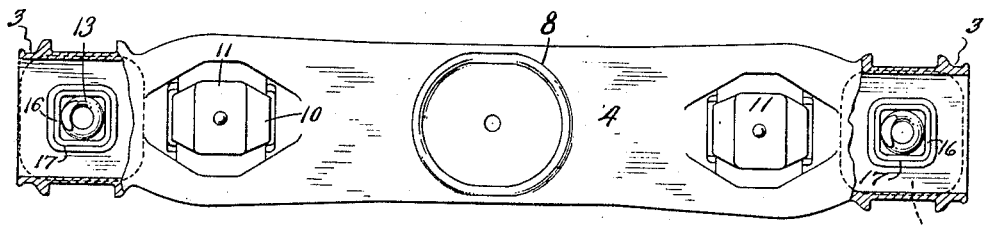
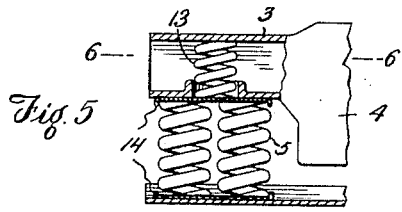
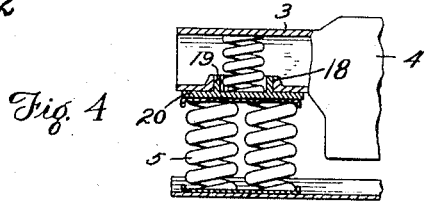
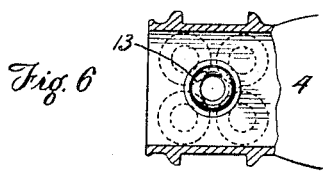
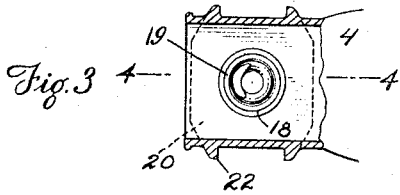
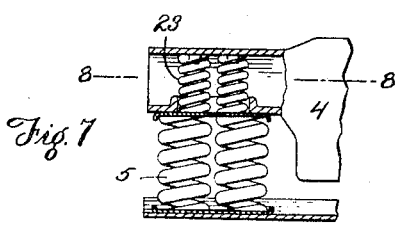
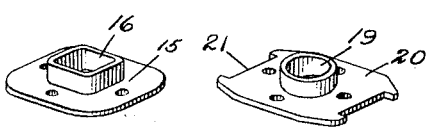
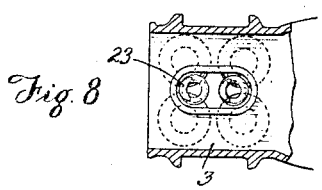

Patented Sept. 10, 1929.

1,727,867

UNITED STATES PATENT OFFICE.

PERCY R. DRENNING, OF BALTIMORE, MARYLAND, ASSIGNOR TO T. H. SYMINGTON & SON, INC., OF BALTIMORE, MARYLAND, A CORPORATION OF MARYLAND.

AUXILIARY SPRING MECHANISM FOR TRUCKS.

Application filed November 12, 1927. Serial No. 232,859.

The invention relates to railway trucks and has special reference to the spring means for supporting the load.

The principal object of the invention, generally stated, is to provide auxiliary spring means operating in series with the usual truck springs provided for supporting the bolster, the auxiliary springs acting not only to increase the general spring travel but also serving to maintain the side bearings of the truck and body bolsters in engagement at all times.

The invention is particularly designed for use in connection with installation or equipment of that type wherein the load is sustained either entirely, partly or occasionally by side bearings, the auxiliary spring means materially assisting in holding the light wheel or wheels in contact with the rail when the car is rocked violently as for example when entering upon or leaving curved track, the effect being really the equivalent to adding dead weight to the side of the truck upon which there is a tendency for the wheels to unload.

A more specific object of the invention is to provide auxiliary spring means of this character located within the truck bolster, the spring means being preferably of the helical type and embodying any desirable number of individual springs which may act directly upon the bolster supporting springs or cooperate therewith through an interposed follower.

Another object of the invention is to provide auxiliary spring and follower means of this type embodying a follower of such construction that it will cooperate with a portion of the truck bolster or the side frames and be thereby held in proper position and prevented from rotating.

Still another object is the provision of auxiliary spring means of this character so mounted and arranged as to be free from changing strains under normal load conditions and prevented from ever going solid with the resultant advantage that a long life will be possessed.

An additional object of the invention is to provide a spring means of this character which will be simple and inexpensive to manufacture and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a view partly in elevation and partly in section showing the preferred form of the invention in applied relation to a truck bolster cooperating with a body bolster, Figure 2 is a view partly in plan and partly in horizontal section showing the same structure as in Figure 1, Figure 3 is a horizontal section through one end of the truck bolster showing a slight modification, Figure 4 is a vertical section therethrough taken on the line 4—4 of Figure 3.

Figure 5 is a fragmentary view partly in elevation and partly in section, of a bolster equipped with a modified form of the auxiliary spring means, Figure 6 is a horizontal section taken on substantially the line 6—6 of Figure 5, Figure 7 is a view similar to Figure 5 showing a plurality of auxiliary springs, Figure 8 is a horizontal section taken on substantially the line 8—8 of Figure 7, Figure 9 is a detail perspective view of one form of follower, Figure 10 is a detail perspective view of the alternative follower shown in Figures 3 and 4.

Referring more particularly to the drawing the numeral 1 designates side frames having the usual window openings 2 therein which receive the end portions 3 of the truck bolster 4 which is supported by the usual or any preferred nest of coil springs 5 mounted upon the spring plank 6. The truck bolster 4 of course supports the body bolster 7 and in the present instance Figure 1 shows the body bolster as capable of lateral motion, the truck bolster having a guide 8 thereon receiving the center plate 9 of the body bolster and having pockets 10 within which are mounted rockers 11 engaged by depending bearing elements 12 carried by the body bolster. Notwithstanding this detailed illustration, it should be understood that the invention can be applied just as readily to trucks of the type in which there is no lateral motion and in fact to trucks where the construction is rigid with the load sustained on the center bearing alone or by the center and side bearings together.

In carrying out the preferred form of the invention, I provide auxiliary springs 13 located within the end portions 3 of the truck bolster, the ends 3 of the truck bolster being preferably open to facilitate the inspection of springs 13. Of course any desired number of the auxiliary springs may be employed though in Figures 1 and 2 I have illustrated only one at each end of the bolster as this may be entirely sufficient. While the auxiliary springs 13 may simply pass through openings in the underside of the truck bolster and engage upon the top of the springs or spring nest 5, the preferred construction is to provide a follower 15 mounted on top of the truck springs 3 and having an upstanding flange 16 extending within an opening 17 in the bottom of the bolster. By making the flange 16 and opening 17 rectangular, it is apparent that the follower cannot be rotatably displaced. This follower may be formed on the usual top plate of the spring nest or may be an entirely distinct and separate element resting thereon. It will be noted that the drawing shows, somewhat conventionally, the truck supporting springs as having retaining plates 14 at the top and bottom thereof, it being considered unnecessary to show any centering means for the springs as such are old and well known in the art and form no part of the present invention.

In Figures 3 and 4 I have illustrated a slight modification in which the opening 18 is circular and in which the upstanding flange 19 on the follower 20, corresponding to the follower 15, is cylindrical. To prevent rotation of the follower it is represented as having its ends recessed or notched at 21 to aline or register with the side frame engaging portions of the bolster. However, this is a mere mechanical detail of construction which may be varied in other ways without in any way affecting the invention itself.

In Figures 5 and 6 the construction is the same as above described except that the auxiliary spring is represented as bearing directly upon the nest of springs 5. Figures 7 and 8 show a structure differing from that in Figures 5 and 6 to the extent that I have shown therein two auxiliary springs 23 within the end of the bolster and seating directly upon the truck springs. In the forms of the invention shown in Figures 5 to 8 inclusive the upstanding flange surrounding the opening in the bottom of the bolster through which the auxiliary spring or springs may project serves as a guide assisting to retain the auxiliary springs in place.

In all cases the interior or auxiliary spring is compressed under the light car until the truck springs or the follower will contact with the underside of the bolster. In this position the static load on the auxiliary spring or springs is slightly less than the light weight of car on the truck springs. The load on the auxiliary spring or springs should compress the same an appreciable amount, say one inch, to compensate and maintain the side bearing rockers 11, in case rockers are provided, in contact with the depending bearing elements 12 on the body bolster and there is a tendency for these surfaces to move out of contact. At this normal spring load the travel should not put the spring solid and therefore the stress can be kept reasonably low. As the working of the auxiliary springs is infrequent their life should be indefinite.

While the auxiliary springs are shown in a bolster which is constructed to permit lateral motion of the body, it should be understood that in case these springs are provided in an installation of the rigid type or where the load is sustained on the center bearings with a nominal clearance at the side bearings, the action would be substantially the same as the auxiliary springs will operate to act against any tendency of the wheels to unload at one side or the other of the truck as for example when the car enters upon or leaves curved track or develops, from any cause, a violent tendency to rock. In such an instance the auxiliary springs will act substantially as additional dead weight applied to the light side.

In addition to the foregoing advantages it may be pointed out that as the auxiliary springs are preferably lighter than the truck springs they will act more quickly and will be capable of taking up small shocks and jars or "jiggle" incident to car travel. It may also be mentioned that the auxiliary springs can be compressed to only a limited extent governed by the engagement of the truck springs or follower, as the case may be, with the underside of the bolster. A solid condition with resultant excessive fiber and other strains will be consequently avoided. Moreover it is conceivable that under some circumstances the difference in the period of vibration of the truck and auxiliary springs will break up synchronism and assist in preventing the development of car roll or side sway. It is believed that the construction, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck embodying side frames, a truck bolster adapted to support a body bolster, springs within the side frames supporting the truck bolster, auxiliary helical springs located within the truck bolster and operating in series with the truck springs, and means for limiting the compression of the auxiliary springs to the height of the bolster.

2. In a railway car truck, a truck bolster seated upon truck springs and containing auxiliary springs of helical form above and acting in series with the truck springs, the truck springs being in standard nest form, and the auxiliary springs seating directly upon the nest.

3. In a railway car truck, a truck bolster seated upon truck springs and containing auxiliary springs of helical form above and acting in series with the truck springs, the truck springs being in nest form, and the auxiliary springs seating upon the nest, the truck bolster having openings in its bottom for the passage of the auxiliary springs.

4. In a railway car truck, a truck bolster seated upon truck springs and containing auxiliary springs of helical form above and acting in series with the truck springs, the truck springs being in nest form, and the auxiliary springs seating upon the nest, the truck bolster having openings in its bottom for the passage of the auxiliary springs, and a follower interposed between the spring nest and the auxiliary springs and abutting against the underside of the bolster.

5. In a railway car truck, the combination with the truck bolster and the nests of truck springs for supporting the bolster, of auxiliary springs mounted within the ends of the bolster, the bottom of the bolster having openings through which the auxiliary springs project whereby they may engage and act in series with the truck springs, and followers interposed between the truck springs and the auxiliary springs and having upstanding flanges extending into said openings, the major portions of the followers being adapted to abut against the underside of the bolster.

6. In a railway car truck, the combination with the truck bolster and the nests of truck springs for supporting the bolster, of auxiliary springs mounted within the ends of the bolster, the bottom of the bolster having openings through which the auxiliary springs project whereby they may engage and act in series with the truck springs, followers interposed between the truck springs and the auxiliary springs and having upstanding flanges extending into said openings, and means for preventing rotative tendencies of the followers with respect to the truck bolster.

In testimony whereof I affix my signature.

PERCY R. DRENNING.